United States Patent
Imai

(10) Patent No.: US 7,370,046 B2
(45) Date of Patent: May 6, 2008

(54) SORT PROCESSING METHOD AND SORT PROCESSING APPARATUS

(75) Inventor: Masatoshi Imai, Kanagawa (JP)

(73) Assignee: Sony Corporation, Tokyo (JP)

( * ) Notice: Subject to any disclaimer, the term of this patent is extended or adjusted under 35 U.S.C. 154(b) by 580 days.

(21) Appl. No.: 10/072,506

(22) Filed: Feb. 5, 2002

(65) Prior Publication Data

US 2002/0116425 A1    Aug. 22, 2002

(30) Foreign Application Priority Data

Feb. 6, 2001    (JP)    ............................ P2001-029425

(51) Int. Cl.
    *G06F 17/30*    (2006.01)
(52) U.S. Cl. ............................................ 707/7; 712/14
(58) Field of Classification Search .................... 707/7; 712/14
    See application file for complete search history.

(56) References Cited

U.S. PATENT DOCUMENTS

| | | | | |
|---|---|---|---|---|
| 3,931,612 A | * | 1/1976 | Stevens et al. ................. | 707/7 |
| 5,274,777 A | * | 12/1993 | Kawata ....................... | 712/218 |
| 5,392,366 A | * | 2/1995 | Nakamura ................... | 382/209 |
| 5,710,937 A | * | 1/1998 | Kasahara ........................ | 707/7 |
| 5,842,207 A | * | 11/1998 | Fujiwara et al. ............... | 707/7 |
| 5,867,601 A | * | 2/1999 | Phillips ...................... | 382/250 |
| 6,021,407 A | * | 2/2000 | Meck et al. ................... | 707/7 |
| 6,775,667 B1 | * | 8/2004 | Lewis et al. ................... | 707/7 |

FOREIGN PATENT DOCUMENTS

| | | |
|---|---|---|
| JP | 64-026223 | 1/1989 |
| JP | 11-126155 | 5/1999 |

* cited by examiner

*Primary Examiner*—Etienne Leroux
*Assistant Examiner*—CamLinh Nguyen
(74) *Attorney, Agent, or Firm*—Fulwider Patton LLP

(57) ABSTRACT

Disclosed are a sort processing method and a sort processing apparatus, which, in a computer or data processing, compare magnitudes of pieces of data input by hardware, rearrange the pieces of data in accordance with a predetermined order and output the rearranged pieces of data. The sort processing apparatus includes first basic cells, each of which is composed of a first data comparator for comparing magnitudes of pieces of input data with each other and for outputting a first select signal, and a first data selector for rearranging said compared pieces of input data in a magnitude order on the basis of said first select signal, wherein said first basic cells having the same number as that of combinations of pieces of input data to be compared are arranged in a pipeline configuration.

15 Claims, 8 Drawing Sheets

SORT PROCESSING METHOD AND SORT PROCESSING APPARATUS

BACKGROUND OF THE INVENTION

The present invention relates to a sort processing method and a sort processing apparatus, which, in a computer or data processing, compare magnitudes of pieces of data input by hardware, rearrange the pieces of data in accordance with a predetermined order and output the rearranged pieces of data.

Algorithms are adopted by software executed by a computer to carry out a sorting process as part of data processing. The easiness of programming of the software, the size of a memory for storing the programmed software and the shortness of a time required for execution of the software vary from algorithm to algorithm. A variety of examples of the algorithms include merge sort, bubble sort, heap sort and quick sort. The algorithm that is considered to be the most superior among them is the quick-sort algorithm.

These algorithms are each implemented as software executed by a computer sequentially. The performance of each algorithm is evaluated from the length of a time required to process a predetermined number of pieces of data being sorted, the number of repetitions of comparison and other criteria.

With the progress of semiconductor technologies and other progress represented by an LSI (Large Scale Integration), sort processing carried out so far by execution of software can now be performed by hardware as well.

The conventional hardware-based sort processing apparatus shown in FIG. 8 compares each input data in accordance with a diallel equation, and results of comparison are summed up. The sum is used as a priority level of the input data. Sort processing is then carried out by selecting input data in accordance with the priority level.

The sort processing apparatus shown in FIG. 8 is a matrix with signals lines from eight input terminals $X1\text{-}(0)$ to $X1\text{-}(7)$, each serving as a row stretched into the horizontal direction, and signals lines from eight input terminals $Y1\text{-}(0)$ to $Y1\text{-}(7)$, each serving as a column stretched into the vertical direction. The input terminals $X1\text{-}(0)$ to $X1\text{-}(7)$, each receive input data and the input terminals $Y1\text{-}(0)$ to $Y1\text{-}(7)$ also each receive input data.

The input terminals $X1\text{-}(0)$ to $X1\text{-}(7)$ receive pieces of input data $1\text{-}(0)$ to $1\text{-}(7)$ respectively. That is to say, input data received by an input terminal $X1\text{-}(0)$ is denoted by reference numeral $1\text{-}(0)$, which is the input terminal's reference numeral $X1\text{-}(0)$ excluding the alphabetic character X. By the same token, the input terminals $Y1\text{-}(0)$ to $Y1\text{-}(7)$ receive the same pieces of input data $1\text{-}(0)$ to $1\text{-}(7)$ respectively. That is to say, input data received by an input terminal $Y1\text{-}(0)$ is denoted by reference numeral $1\text{-}(0)$, which is the input terminal's reference numeral $Y1\text{-}(0)$ excluding the alphabetic character Y. Thus, the input terminal $X1\text{-}(0)$ receives the input data $1\text{-}(0)$ which is also received by the input terminal $Y1\text{-}(0)$.

The matrix of the sort processing apparatus is a matrix of comparators $2\text{-}(01)$ to $2\text{-}(07)$ compare the input data received by the input terminal $X1\text{-}(0)$ with pieces of input data, which are received by the input terminals $Y1\text{-}(1)$ to $Y1\text{-}(07)$ respectively.

By the same token, the comparator $2\text{-}(10)$ and the comparators $2\text{-}(12)$ to $2\text{-}(17)$ compare the input data received by the input terminal $X1\text{-}(1)$ with pieces of input data received by the input terminal $Y1\text{-}(0)$ and the input terminals $Y1\text{-}(2)$ to $Y1\text{-}(7)$.

In the same way, the comparators $2\text{-}(20)$ to $2\text{-}(27)$ compare the input data received by the input terminal $X1\text{-}(2)$ with pieces of input data received by the input terminals $Y1\text{-}(0)$ to $Y1\text{-}(7)$. Likewise, the comparators $2\text{-}(70)$ to $2\text{-}(76)$ compare the input data received by the input terminal $X1\text{-}(7)$ with pieces of input data received by the input terminals $Y1\text{-}(0)$ to $Y1\text{-}(7)$.

An adder $3\text{-}(0)$ sums up comparison results of seven bits output by the comparators $2\text{-}(01)$ to $2\text{-}(07)$. By the same token, an adder $3\text{-}(1)$ sums up comparison results of seven bits output by the comparator $2\text{-}(10)$ and the comparators $2\text{-}(12)$ to $2\text{-}(17)$. In the same way, adder $3\text{-}(2)$ sums up comparison results of seven bits output by the comparators $2\text{-}(20)$ to $2\text{-}(27)$. Likewise, an adder $3\text{-}(7)$ sums up comparison results of seven bits output by the comparators $2\text{-}(70)$ to $2\text{-}(76)$ A converter $5$ converts the priority levels D40 to D47 output by the adders $3\text{-}(0)$ to $3\text{-}(7)$ respectively into 3-bit priority signals D60 to D67 respectively. The 3-bit priority signals D60 to D67 each indicate which piece of input data is largest.

Multiplexers $7\text{-}(0)$ to $7\text{-}(7)$ each receive eight pieces of data through input terminals $Z1\text{-}(0)$ to $Z1\text{-}(7)$. These eight pieces of input data are the same pieces of input data supplied to the input terminals $X1\text{-}(0)$ to $X1\text{-}(7)$ and $Y1\text{-}(0)$ to $Y1\text{-}(7)$. That is to say, input data received by an input terminal $Z1\text{-}(0)$ to $Z1\text{-}(7)$ is denoted by reference numeral $1\text{-}(0)$ to $1\text{-}(7)$, which is the input terminal's reference numeral $Z1\text{-}(i)$ excluding the alphabetic character Z or reference numerals $X1\text{-}(0)$ to $X1\text{-}(7)$ and $Y1\text{-}(0)$ to $Y1\text{-}(7)$ without the alphabetical characters X and Y respectively.

In accordance with the 3-bit priority signals D60 to D67 output by the converter $5$, the multiplexers $7\text{-}(0)$ to $7\text{-}(7)$ each select one of the eight pieces of input data supplied to the input terminals $Z1\text{-}(0)$ to $Z1\text{-}(7)$. The multiplexers $7\text{-}(0)$ to $7\text{-}(7)$ select pieces of input data, which are different from each other, sorting the eight pieces of input data. The multiplexers $7\text{-}(0)$ to $7\text{-}(7)$ supply the sorted pieces of input data to output terminals $8\text{-}(0)$ to $8\text{-}(7)$ respectively.

In the configuration described above, the comparators $2\text{-}(01)$ to $2\text{-}(07)$ compare the magnitude of the input data received by the input terminal $X1\text{-}(0)$ with the magnitudes of the pieces of input data received by the input terminals $Y1\text{-}(1)$ to $Y1\text{-}(7)$ respectively. If results of the comparison indicate that the magnitude of the input data received by the input terminal $X1\text{-}(0)$ is smaller than the magnitudes of the pieces of input data received by the input terminals $Y1\text{-}(1)$ to $Y1\text{-}(7)$, the signals output by the comparators $2\text{-}(01)$ to $2\text{-}(07)$ will each be set to an active state to indicate the results of the comparison.

To put it concretely, the signals output by the comparators $2\text{-}(01)$ to $2\text{-}(07)$ are active if the results of the comparison indicate that the magnitude of the input data received by the input terminals $X1\text{-}(0)$ to $X1\text{-}(7)$ is smaller than the magnitudes of the pieces of input data received by the input terminals $Y1\text{-}(0)$ to $Y1\text{-}(7)$. For example, the signal output by the comparator $2\text{-}(01)$ is active if the result of the comparison indicates that the magnitude of the input data received by the input terminal $X1\text{-}(0)$ is smaller than the magnitude of the input data received by the input terminal $Y1\text{-}(1)$.

The comparison results output by the comparators $2\text{-}(01)$ to $2(07)$ are supplied to the adder $3\text{-}(0)$, which sums up active comparison results, generating a priority level D40 representing the sum of the active comparison results.

By the same token, the comparator $2\text{-}(10)$ to $2\text{-}(17)$ compare the input data received by the input terminal $X1\text{-}(1)$ with pieces of input data received by the input terminal Y1-(0) to Y1-(7), outputting active or inactive signals representing the results of the comparison. In the same way, the comparators 2-(20) to 2-(27) compare the input data received by the input terminal X1-(2) with pieces of input data received by the input terminals Y1-(0) to Y1-(7), outputting active or inactive signals representing the results of the comparison. Likewise, the comparators 2-(70) to 2-(76) compare the input data received by the input terminal X1-(7) with pieces of input data received by the input terminals Y1-(0) to Y1-(6), outputting active or inactive signals representing the results of the comparison.

The comparison results output by the comparator 2-(10) to 2-(17) are supplied to the adder 3-(1), which sums up active comparison results, generating a priority level D41 representing the sum of the active comparison results. Likewise, the comparison results output by the comparators 2-(70) to 2-(76) are supplied to the adder 3-(7), which sums up active comparison results, generating a priority level D47 representing the sum of the active comparison results.

The converter 5 converts the priority levels D40 to D47 supplied thereto by the adders 3-(0) to 3-(7) respectively into 3-bit priority signals D60 to D67 respectively. The 3-bit priority signals D60 to D67 each indicate the size of each piece of input data.

In accordance with the 3-bit priority signals D60 to D67 output by the converter 5, the multiplexers 7-(0) to 7-(7) each select one of the eight pieces of input data supplied to the input terminals Z1-(0) to Z1-(7). The multiplexers 7-(0) to 7-(7) select pieces of input data, which are different from each other, sorting the eight pieces of input data, and supply the sorted pieces of input data to output terminals 8-(0) to 8-(7) respectively.

Assume that the number of pieces of input data to be compared is N. In this case, in general, the total number of comparison of input data is theoretically equal to the number of possible combinations of two pieces extracted from the N pieces of input as follows;

$$\text{The number of comparison of input data} = N \times (N-1)/2 \quad (1)$$

However, since the conventional sort processing apparatus described above compares pieces of input data by using a matrix of comparators in accordance with a diallel equation, the number of required comparators is expressed as follows:

$$\text{The number of comparators} = N \times (N-1) \quad (2)$$

It is obvious that the number of comparators expressed by equation (2) is twice the minimum number of theoretically required comparators, which is expressed by equation (1).

In addition, after comparison, the sort processing apparatus carries out numerous kinds of rearrangement processing such as additions, conversion and multiplexing. It means that implementation of sort processing by hardware entails an increased circuit size. Furthermore, if the number of pieces of input data rises, not only does the circuit size increase, but the processing time also becomes longer as well.

Moreover, the circuit of the converter 5 for converting results of comparison is difficult to implement. Since the larger the number of pieces of input data is, the more complex the circuit of the converter 5 becomes, and there raises a problem of inconvenience encountered in the hardware implementation of the sort processing apparatus.

SUMMARY OF THE INVENTION

It is an object of the present invention addressing the problems described above to provide a sort processing method and a sort processing apparatus, which, in a computer or data processing, compare magnitudes of pieces of data input by hardware, rearrange the pieces of data in accordance with a predetermined order and output the data by using a circuit with a small size in a short period of time.

In accordance with an aspect of the present invention, in order to solve the problems described above, there is provided a sort processing method for comparing pieces of input data with each other and rearranging the pieces of input data in accordance with results of comparison by repeatedly subjecting the pieces of input data to pipelining of repetitive basic processes each includes, comparison processing for comparing pieces of input data with each other by using comparators, and selection processing for selecting pieces of input data by using data selectors wherein the total number of such basic processes is equal to the number of combinations of pieces of input data to be compared.

In addition, in accordance with another aspect of the present invention, in order to solve the problems described above, there is provided a first sort processing apparatus, which is used for comparing pieces of input data with each other and for rearranging the pieces of input data in accordance with results of comparison and is provided with first basic cells each including, a first data comparator for comparing pieces of input data with each other and for outputting a first select signal, and first data selectors for rearranging the compared pieces of input data in a magnitude order on the basis of the first select signal, wherein as many such first basic cells as combinations of pieces of input data to be compared are arranged in a pipeline configuration.

Furthermore, in accordance with a further aspect of the present invention, in order to solve the problems described above, there is provided a second sort processing apparatus, which is used for comparing pieces of compound data including key data and relevant data related to the key data with each other and for rearranging the pieces of compound data in accordance with results of comparison and is provided with second basic cells each including, a second data comparator for comparing pieces of compound data with each other and for outputting a second select signal, and second data selectors for rearranging the compared pieces of compound data in a magnitude order on the basis of the second select signal, wherein as many such second basic cells as combinations of pieces of compound data to be compared are arranged in a pipeline configuration.

The sort processing method provided by the present invention can be implemented by arranging only a minimum number of simple basic processes theoretically required for sorting all pieces of input data in a repetitive pipeline configuration. Thus, in comparison with the conventional sort processing method, the sort processing method provided by the present invention can be implemented by compact hardware and in a short processing time. In addition, an increased number of pieces of input data can be handled by merely adding basic processes. As a result, the size of the hardware can be increased with ease.

In addition, the first sort processing apparatus provided by the present invention simply and repetitively uses a minimum number of theoretically required first basic cells arranged in a pipeline configuration for processing all pieces of input data in order to carry out sort processing. By the same token, the second sort processing apparatus provided by the present invention simply and repetitively uses a minimum number of theoretically required second basic cells arranged in a pipeline configuration for processing all pieces of compound data in order to carry out sort processing. Thus, the adders and the converter employed in each of the conventional sort processing apparatus are no longer necessary. As a result, the first and second sort processing apparatuses can each be implemented by compact hardware capable of carrying out the sort processing in a short period of processing time.

Furthermore, the first sort processing apparatus provided by the present invention is capable of handling an increased number of pieces of input data by simply newly adding first basic cells in accordance with the additional pieces of input data. In the same way, the second sort processing apparatus provided by the present invention is capable of handling an increased number of pieces of compound data by simply newly adding second basic cells in accordance with the additional pieces of compound data. As a result, the size of hardware for implementing the first or second sort processing apparatuses can be increased with ease.

Moreover, in particular, besides the capabilities described above, the second sort processing apparatus provided by the present invention offers a merit that each input data may comprise a plurality of pieces of data related to each other. In this case, one of the pieces of data is used as key data. Then, while pieces of key data are being sorted into a magnitude order, pieces of relevant data, which are related to the pieces of key data, are arranged by associating the pieces of relevant data with the pieces of key data.

DETAILED DESCRIPTION OF THE PREFERRED EMBODIMENTS

Figure 1:
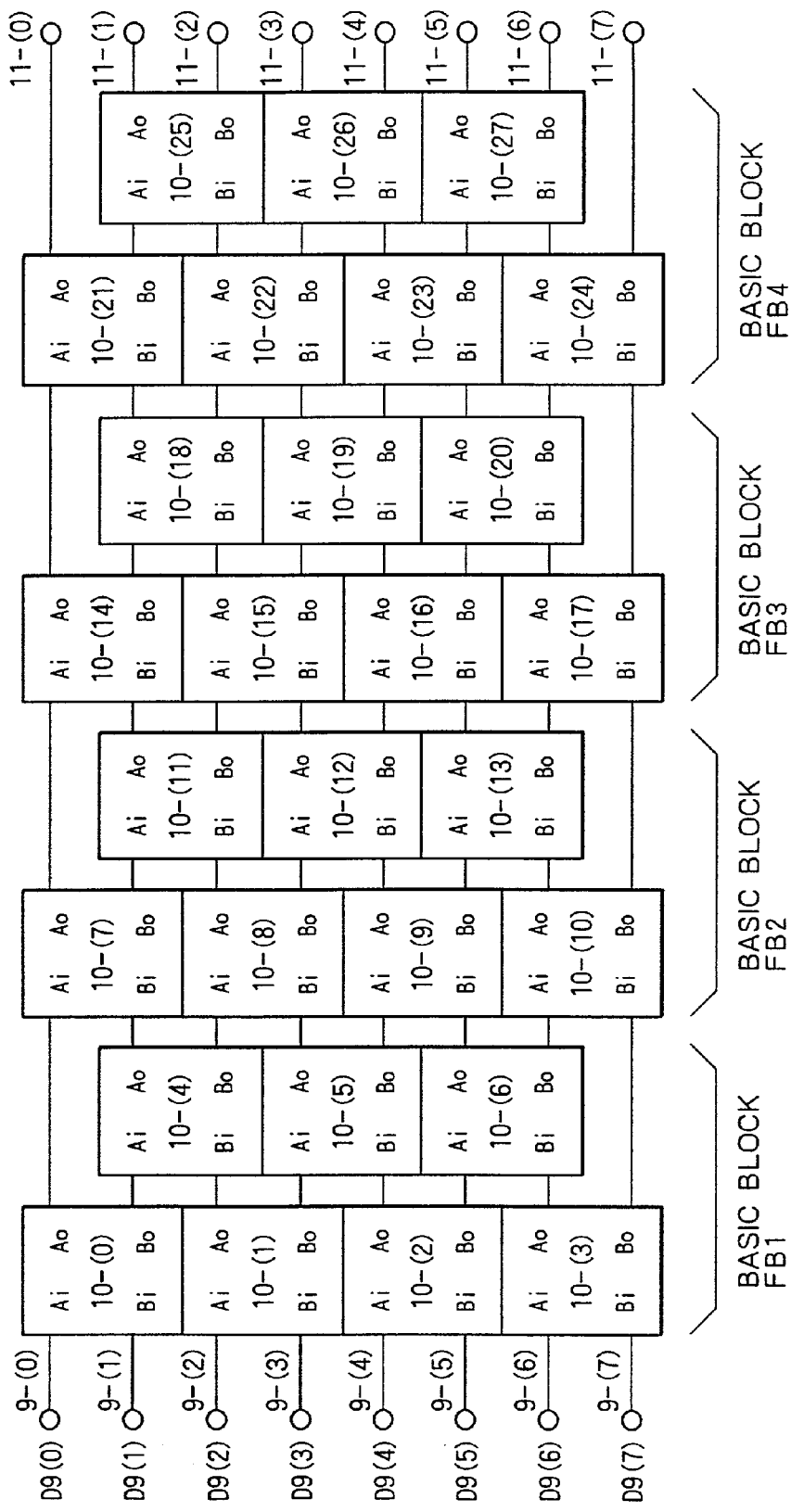
FIG. 1 is a block diagram showing the configuration of a first embodiment of the present invention in a simple manner.

The following description explains the preferred embodiments of the present invention implementing a sort processing method and sort processing apparatus by referring to diagrams. FIG. 1 is a diagram diagrammatically showing the overall configuration of a first embodiment implementing a sort processing apparatus provided by the present invention. In this case, eight pieces of input data are supplied to the sort processing apparatus.

As shown in the figure, external input terminals 9-(0) and 9-(1) are connected respectively to input terminals Ai and Bi of a first-stage basic cell 10-(0) for carrying out basic processing. The first-stage basic cell 10-(0) comprises a data comparator for comparing pieces of input data with each other and a data selector for carrying out select processing as will be described later in detail. Pieces of data, which have been sorted in accordance with results of the comparison, are supplied to output terminals Ao and Bo of the first-stage basic cell 10-(0).

As shown in the figure, input data D9(0) and input data D9(1) are supplied to the external input terminals 9-(0) and 9-(1) respectively. The first-stage basic cell 10-(0) compares the input data D9(0) with the input data D9(1), outputting the smaller and greater ones to the output terminals Ao and Bo respectively.

By the same token, external input terminals 9-(2) and 9-(3) are connected respectively to input terminals Ai and Bi of a first-stage basic cell 10-(1), and external input terminals 9-(4) and 9-(5) are connected respectively to input terminals Ai and Bi of a first-stage basic cell 10-(2) whereas external input terminals 9-(6) and 9-(7) are connected respectively to input terminals Ai and Bi of a first-stage basic cell 10-(3). In the same way, the first-stage basic cells 10-(1)-to 10-(3) comprise a data comparator for comparing pieces of input data with each other and a data selector for carrying out select processing, and pieces of data, which have been sorted in accordance with results of the comparison, are supplied to output terminals Ao and Bo.

Likewise, input data D9(2) and input data D9(3) are supplied to the external input terminals 9-(2) and 9-(3) respectively. The first-stage basic cell 10-(1) compares the input data D9(2) with the input data D9(3), outputting the smaller and greater ones to respectively the output terminals Ao and Bo of the first-stage basic cell 10-(1). Similarly, input data D9(4) and input data D9(5) are supplied to the external input terminals 9-(4) and 9-(5) respectively. The first-stage basic cell 10-(2) compares the input data D9(4) with the input data D9(5), outputting the smaller and greater ones to respectively the output terminals Ao and Bo of the first-stage basic cell 10-(2). By the same token, input data D9(6) and input data D9(7) are supplied to the external input terminals 9-(6) and 9-(7) respectively. The first-stage basic cell 10-(3) compares the input data D9(6) with the input data D9(7), outputting the smaller and greater ones to respectively the output terminals Ao and Bo of the first-stage basic cell 10-(3).

Input terminals Ai and Bi of a second-stage basic cell 10-(4) are connected to respectively the output terminal Bo of the first-stage basic cell 10-(0) and the output terminal Ao of the first-stage basic cell 10-(1). In the same way, input terminals Ai and Bi of a second-stage basic cell 10-(5) are connected to respectively the output terminal Bo of the first-stage basic cell 10-(1) and the output terminal Ao of the first-stage basic cell 10-(2). Similarly, input terminals Ai and Bi of a second-stage basic cell 10-(6) are connected to respectively the output terminal Bo of the first-stage basic cell 10-(2) and the output terminal Ao of the first-stage basic cell 10-(3). Likewise, the second-stage basic cell 10-(i) comprises a data comparator for comparing pieces of input data with each other and a data selector for carrying out select processing, and pieces of data, which have been sorted in accordance with results of the comparison, are supplied to output terminals Ao and Bo of the first-stage basic cells 10-(4) to 10-(6).

As described above, the first-stage basic cells 10-(0) and 10-(1) are connected in series to the second-stage basic cell 10-(4) to form a pipeline configuration, wherein while the first-stage basic cells 10-(0) and 10-(1) are outputting sorted pieces of data to the second-stage basic cell 10-(4), and next pieces of input data are supplied to the first-stage basic cells 10-(0) and 10-(1). By the same token, the first-stage basic cells 10-(1) and 10-(2) are connected in series to the second-stage basic cell 10-(5) to form a similar pipeline configuration. In the same way, the first-stage basic cells 10-(2) and 10-(3) are connected in series to the second-stage basic cell 10-(6) to form a similar pipeline configuration.

The second-stage basic cell 10-(4) compares pieces of data received from the first-stage basic cells 10-(0) and 10-(1), outputting the smaller and greater ones to respectively the output terminals Ao and Bo of the second-stage basic cell 10-(4). Likewise, the second-stage basic cell 10-(5) compares pieces of data received from the first-stage basic cells 10-(1) and 10-(2), outputting the smaller and greater ones to respectively the output terminals Ao and Bo of the second-stage basic cell 10-(5). By the same token, the second-stage basic cell 10-(6) compares pieces of data received from the first-stage basic cells 10-(2) and 10-(3), outputting the smaller and greater ones to respectively the output terminals Ao and Bo of the second-stage basic cell 10-(6). Pieces of data output from the output terminal Ao of the first-stage basic cell 10-(0) and the output terminal Bo of the first-stage basic cell 10-(3) are not processed by the second-stage basic cells 10-(4) to 10-(6).

A basic block FB1 comprises seven basic cells, namely, the first-stage basic cells 10-(0) to 10-(3) and the second-stage basic cells 10-(4) to 10-(6). The basic block FB1 carries out the comparison and sorting processing two times on the pieces of input data D9(0) to D0(7), outputting 8 processing results, namely, pieces of data from the output terminals Ao and Bo of each of the second-stage basic cells 10-(4), 10-(5) and 10-(6), and the pieces of data output from the output terminal Ao of the first-stage basic cell 10-(0) and the output terminal Bo of the first-stage basic cell 10-(3).

The 8 processing results output by the basic block FB1 are supplied to third-stage basic cells 10-(7) to 10-(10) employed in a next basic block FB2, which also includes fourth-stage basic cells 10-(11) to 10-(13) in the same way as the pieces of input data D9(0) to DO(7) are supplied to the first-stage basic cells 10-(0) to 10-(3) of the basic block FB1.

In the same way as the first-stage basic cells 10-(0) to 10-(3) are connected to the second-stage basic cells 10-(4) to 10-(6) in the basic block FB1, the third-stage basic cells 10-(7) to 10-(10) are connected in series to the fourth-stage basic cells 10-(11) to 10-(13) to form a similar pipeline configuration in the basic block FB2. In the basic block FBtwo pieces of data, which are sorted by the third-stage basic cells 10-(7) to 10-(10), are supplied to the three fourth-stage basic cells 10-(11) to 10-(13). As a result, the basic block FB2 outputs eight sorted pieces of data as pieces of input data to a next basic block FB3 in the same way as the basic block FB1 outputs the eight sorted pieces of data as pieces of input data to the basic block FB2.

The basic block FB3 also includes seven basic cells 10(14) to 10-(20). The fifth-stage basic cells 10-(14) to 10-(17) are used for receiving the eight sorted pieces of data from the basic block FB2 in the same way as the pieces of input data D9(0) to DO(7) are received by the first-stage basic cells 10-(0) to 10-(3) of the basic block FB1.

In the same way as the first-stage basic cells 10-(0) to 10-(3) are connected to the second-stage basic cells 10-(4) to 10-(6) in the basic block FB1, the fifth-stage basic cells 10-(14) to 10-(17) are connected in series to the sixth-stage basic cells 10-(18) to 10-(20) to form a similar pipeline configuration in the basic block FB3. In the basic block FB3, pieces of data, which are sorted by the fifth-stage basic cells 10-(14) to 10-(17), are supplied to the three sixth-stage basic cells 10-(18) to 10-(20). As a result, the basic block FB3 outputs eight sorted pieces of data as pieces of input data to a next basic block FB4 in the same way as the basic block FB1 outputs the eight sorted pieces of data as pieces of input data to the basic block FB2.

The 8 processing results output by the basic block FB3 are supplied to seventh-stage basic cells 10-(21) to 10-(24) of a next basic block FB4, which also includes eighth-stage basic cells 10-(25) to 10-(27) in the same way as the pieces of input data D9(0) to D0(7) are supplied to the first-stage basic cells 10-(0) to 10-(3) of the basic block FB1.

In the same way as the first-stage basic cells 10-(0) to 10-(3) are connected to the second-stage basic cells 10-(4) to 10-(6) in the basic block FB1, the seventh-stage basic cells 10-(21) to 10-(24) are connected in series to the eighth-stage basic cells 10-(25) to 10-(27) to form a similar pipeline configuration in the basic block FB4. In the basic block FB4, pieces of data, which are sorted by the seventh-stage basic cells 10-(21) to 10-(24), are supplied to the three eighth-stage basic cells 10-(25) to 10-(27). As a result, the basic block FB4 outputs eight sorted pieces of data as final pieces of output data to external output terminals 11-(0) to 11-(7) respectively in the same way as the basic block FB1 outputs the eight sorted pieces of data as pieces of input data to the basic block FB2.

Pieces of data, which are obtained as results of sort processing of the pieces of input data D9(0) to D9(7), appear at the terminal output Ao of the seventh-stage basic cell 10-(21), the output terminals Ao and Bo of each of the eighth-stage basic cells 10-(25) to 10-(27) and the output terminal Bo of the seventh-stage basic cell 10-(24). The pieces of data are supplied as they are to the external output terminals 11-(0) to 11-(7) respectively in an increasing-magnitude order starting with the minimum at the external output terminal 11-(0) and ending with the maximum at the external output terminal 11-(7).

As described above, the basic blocks FB1 to FB4, which each comprises seven basic cells having uniform structures, are connected to each other to form a pipeline configuration. The basic blocks FB1 to FB4 constitute a sort processing apparatus. The sort processing apparatus is thus a group of 28 basic cells. The 28 basic cells are each the aforementioned first basic cell provided by the present invention.

Since the number of pieces of input data supplied to the sort processing is 8 (N=8), the number of comparison carried out on the pieces of input data is 8×7/2=28 as is expressed by equation (1). This number is equal to the minimum number of theoretically required basic cells.

Figure 2:
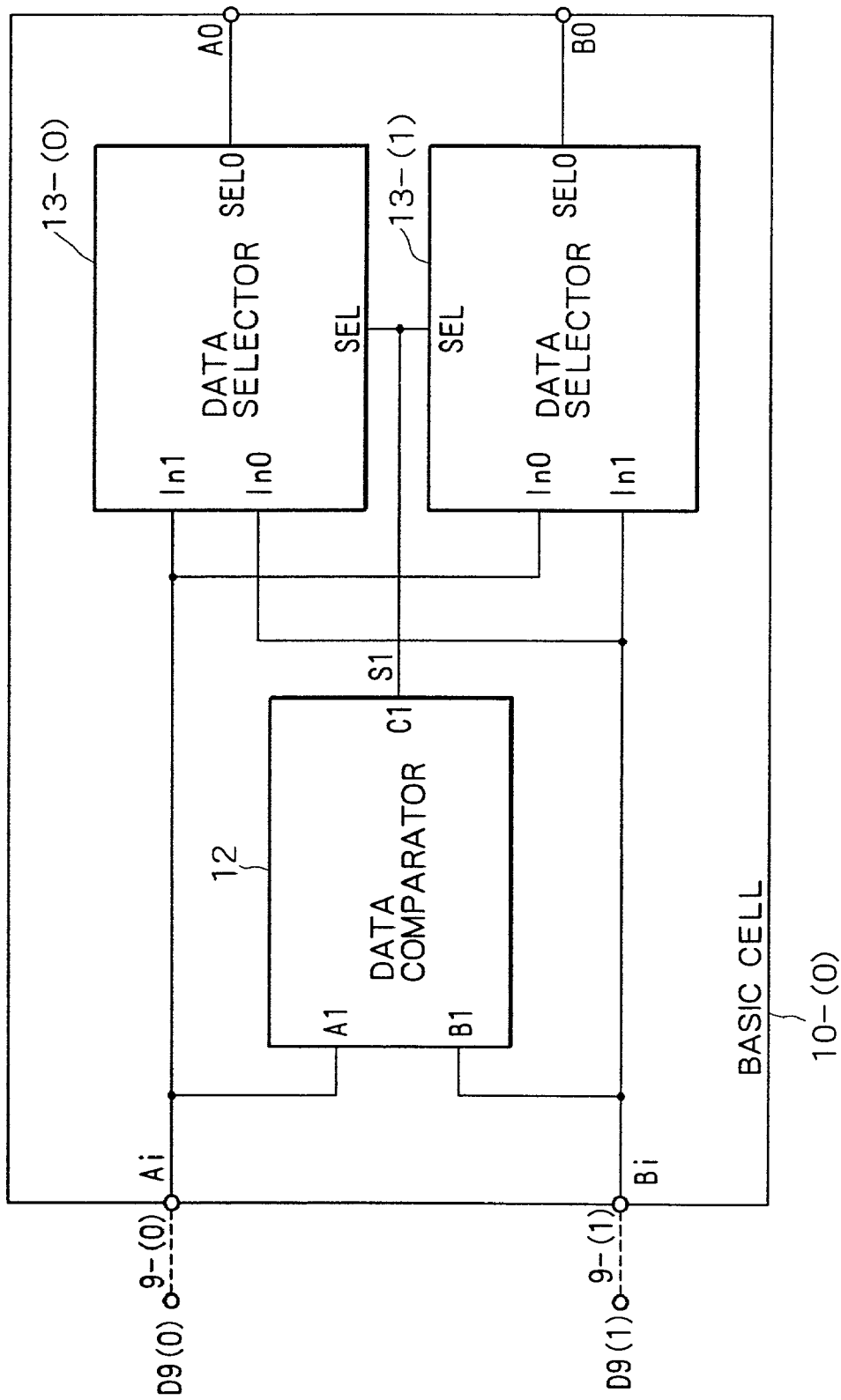
FIG. 2 is a block diagram showing the configuration of each of first basic cells each serving as a configuration element of the embodiment shown in FIG. 1.

Next, the internal structure of the first basic cell is explained by referring to FIG. 2. The basic cell 10-(0) shown in FIG. 1 is used as a representative first basic cell explained below. As shown in FIG. 2, the basic cell 10-(0) comprises a data comparator 12 serving as the aforementioned first data comparator provided by the present invention, and data selectors 13-(0) and 13-(1) each serving as the aforementioned first data selector provided by the present invention.

The input terminals Ai and Bi of the basic cell 10-(0) are connected to the external input terminals 9-(0) and 9-(1) respectively. The external input terminals 9-(0) and 9-(1) receive the pieces of input data D9(0) and D9(1) respectively as shown in FIG. 1.

The input terminals Ai and Bi of the basic cell 10-(0) are also connected respectively to input terminals Ai and Bi of the data comparator 12, which compares the input data D9(0) with the input data D9(1), generating a select signal S1 at an output terminal C1 of the data comparator 12 as a result of comparison. The select signal S1 functions as the aforementioned first select signal provided by the present invention.

In addition, the input terminal Ai of the basic cell 10-(0) is also connected to an input terminal In1 of the data selector 13-(0) and an input terminal In0 of the data selector 13-(1). On the other hand, the input terminal Bi of the basic cell 10-(0) is also connected to an input terminal In0 of the data selector 13-(0) and an input terminal In1 of the data selector 13-(1).

The select signal S1 is supplied to a control terminal SEL of the data selector 13-(0) and a control terminal SEL of the data selector 13-(1). An output terminal SEL0 of the data selector 13-(0) and an output terminal SEL0 of the data selector 13-(1) are connected to respectively the output terminals Ao and Bo of the basic cell 10-(0).

The following description explains the operation of the basic cell 10-(0) with the configuration described above. As described above, the data comparator 12 compares the input data D9(0) with the input data D9(1). If the input data D9(1) is found greater than the input data D9(0), the select signal S1 is set at a logic value of "1". If the input data D9(1) is found equal to or smaller than the input data D9(0), on the other hand, the select signal S1 is set at a logic value of "0".

If the select signal S1 is set at a logic value of "1" to indicate that D9(1)>D9(0), the data selector 13-(0) passes on the input data D9(0) received at the input terminal In1 to the output terminal Ao by way of the output terminal SEL0, and the data selector 13-(1) passes on the input data D9(1) received at the input terminal In1 to the output terminal Bo by way of the output terminal SEL0.

That is to say, for D9(1)>D9(0), D9(0) and D9(1) are sorted so that the smaller data D9(0) is supplied to the output terminal Ao and the larger data D9(1) is supplied to the output terminal Bo.

If the select signal S1 is set at a logic value of "0" to indicate that D9(1)≦D9(0), on the other hand, the data selector 13-(0) passes on the input data D9(1) received at the input terminal In0 to the output terminal Ao by way of the output terminal SEL0, and the data selector 13-(1) passes on the input data D9(0) received at the input terminal In0 to the output terminal Bo by way of the output terminal SEL0.

That is to say, for D9(1)<D9(0), D9(0) and D9(1) are sorted so that the smaller data D9(1) is supplied to the output terminal Ao and the larger data D9(0) is supplied to the output terminal Bo. For D9(1)=D9(0), the data D9(1) is supplied to the output terminal Ao and the data D9(0) is supplied to the output terminal Bo.

To summarize what has been described above, in the basic cell 10-(0), the data comparator 12, the data selectors 13-(0) and 13-(1) operate to compare input data supplied to the input terminal Ai with input data supplied to the input terminal Bi and, if the input data supplied to the input terminal Bi is found greater than the input data supplied to the input terminal Ai, the input data supplied to the input terminal Ai is passed on to the output terminal Ao while the input data supplied to the input terminal Bi is passed on to the terminal Bo.

If the basic cell 10-(0) finds that the input data supplied to the input terminal Bi is equal to or smaller than the input data supplied to the input terminal Ai, the input data supplied to the input terminal Ai is passed on to the output terminal Bo while the input data supplied to the input terminal Bi is passed on to the output terminal Ao.

As described above, pieces of input data are rearranged so that data passed on to the output terminal Ao is always equal to or smaller than data passed on to the output terminal Bo without regard to the magnitude order in which the pieces of input data are supplied to the input terminals Ai and Bi. Thus, the basic cell 10-(0) functions as a sort processing unit having two inputs.

In addition, the comparison condition of the data comparator 12 can also be set as follows. That is to say, if the input data D9(1) is found smaller than the input data D9(0), the select signal S1 is set at a logic value of "1", and if the input data D9(1) is found equal to or greater than the input data D9(0), the select signal S1 is set at a logic value of "0". In this case, the basic cell 10-(0) functions as a sort processing unit comprising the data comparator 12 and the data selectors 13-(0) and 13-(1) that sort pieces of input data into the reversed order.

Figure 3:
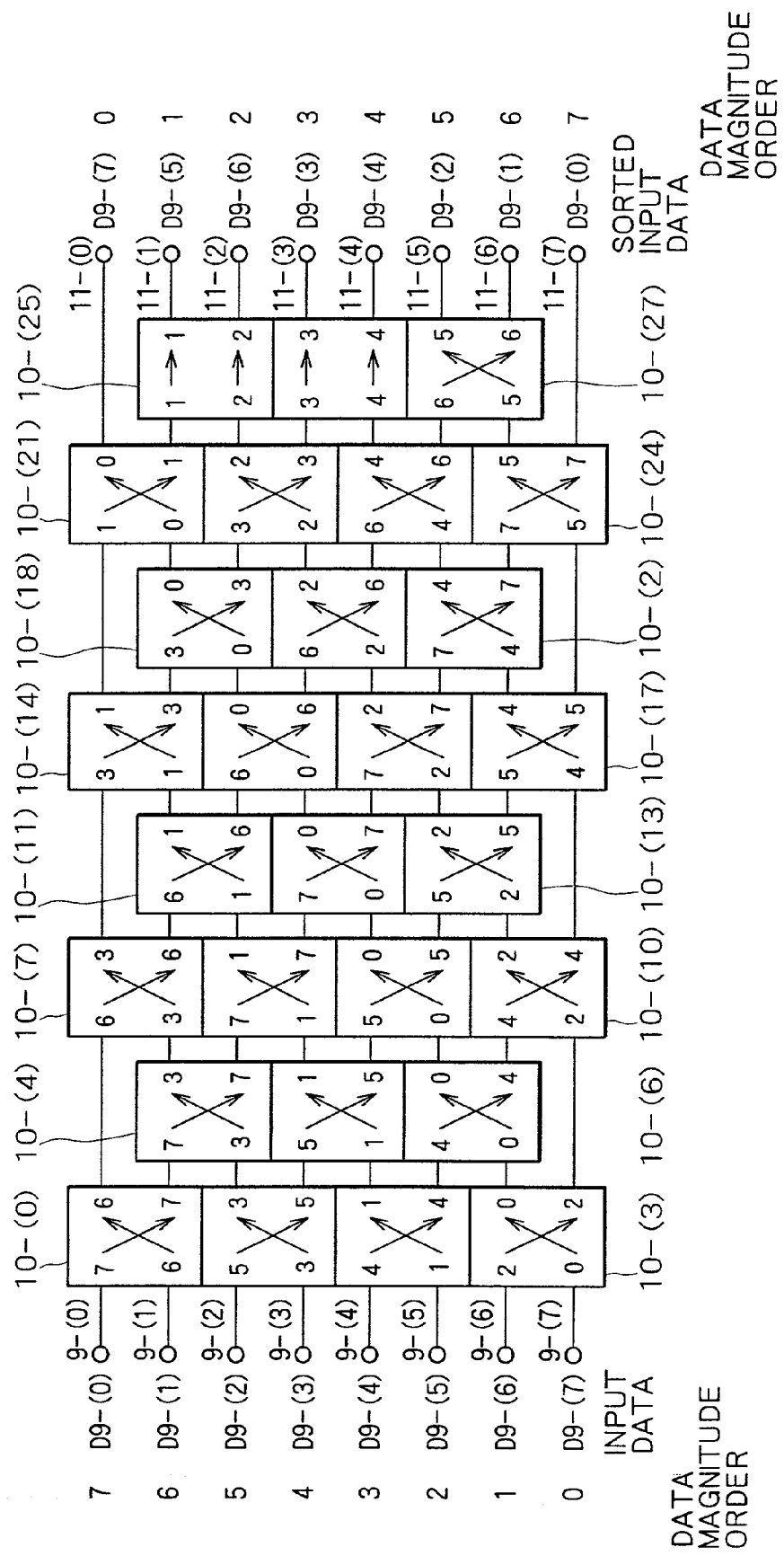
FIG. 3 is an explanatory diagram showing operations to swap pieces of data with each other in the course of sort processing carried out by the embodiment shown in FIG. 1.

FIG. 3 is an explanatory diagram showing a model of typical sort processing carried out by the 8-input sort processing apparatus comprising the basic cells of FIG. 2 combined repeatedly as shown in FIG. 1.

As described before, the external input terminals 9-(0) to 9-(1) receive pieces of input data D9(0) to D9(1) respectively. At the left end of FIG. 3, reference numerals 0 to 7 assigned to the pieces of input data D9(0) to D9(1) indicate the order of the magnitudes of the pieces of input data D9(0) to D9(1) as follows: D9(0)>D9(1)>D9(2)>D9(4)>D9(3)>D9(6)>D9(5)>D9(7).

In the process of passing through the basic cells 10-(0) to 10-(27), the pieces of input data D9(0) to D9(7) are subjected to sorting based on comparison of magnitudes. In the course of the process of passing through the basic cells 10-(0) to 10-(27), the pieces of input data D9(0) to D9(7) are swapped with each other in accordance with results of magnitude comparison as shown by arrows. The pieces of data are finally supplied to the external output terminals 11-(0) to 11-(7) respectively in an increasing-magnitude order starting with the minimum at the output terminal 11-(0) and ending with the maximum at the external output terminal 11-(7) as indicated by reference numerals 0 to 7 assigned to the external output terminals 11-(0) to 11-(7) respectively at the right end.

In the basic cells 10-(0) to 10-(27), pieces of data are swapped with each other in accordance with results of magnitude comparison. In the basic cells 10-(25) and 10-(26), the pieces of data are not swapped with each other in accordance with results of magnitude comparison.

The embodiment shown in FIG. 1 receives eight pieces of input data, which are an even number. It should be noted, however, that the number of pieces of input data can also be odd. In this case, an additional piece of input data is prepared as invalid input data, assume that the number of pieces of input data is 7. In this case, sort processing can be carried out by additionally preparing large data greater than the maximum among the seven pieces of theoretically valid input data or adding small data smaller than the minimum among the seven pieces of theoretically valid input data as the invalid input data.

Assume that a large data greater than the maximum among the seven pieces of theoretically valid input data is additionally prepared as the invalid input data. In this case, the most significant bit of the invalid input data is set at 1. On the other hand, the most significant bit of any of the valid input data is set at 0. By doing so, the invalid input data always appears as largest output data at the external output terminal 11-(7) while the seven remaining pieces of valid input data are supplied to the external output terminals 11-(0) to 11-(6).

The above description explains a case in which basic cells are arranged to form a pipeline configuration for sorting pieces of single input data. It should be noted, however, that the present invention can also be applied to sort processing of pieces of compound data.

Figure 4:
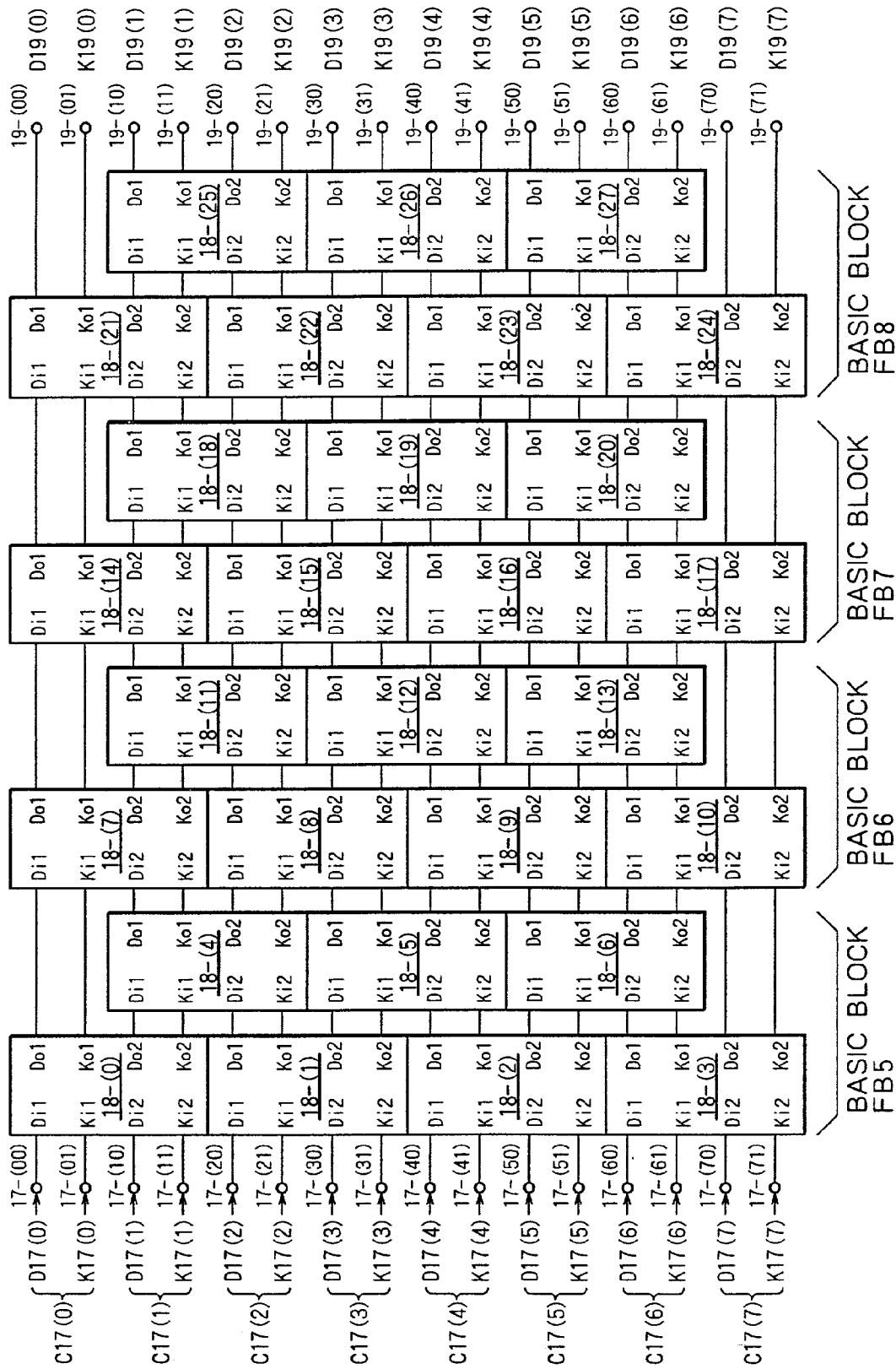
FIG. 4 is a block diagram simply showing the configuration of second embodiment of the present invention for handling pieces of compound data as each of its inputs.

FIG. 4 is a diagram showing an embodiment implementing a sort processing apparatus for sorting eight pieces of compound data comprising key data and relevant data related to the key data. Examples of the key data and the relevant data are respectively like an ID number of a student and test result marks gained by the student. That is to say, the students' ID numbers each used as a piece of relevant data are sorted by using marks, which are gained by the students and are each used as a piece of key data.

This sort processing apparatus is a group of 28 basic cells, namely, the basic cells 18-(0) to 18-(27). The group of 28 basic cells is organized into basic blocks FB5 to FB8, which are connected to each other to form a pipeline configuration. Each of the basic blocks FB5 to FB8 comprises seven basic cells as each of the basic blocks FBI to FB4 shown in FIG. 1 does.

External input terminals 17-(00), 17-(01), 17-(10) and 17-(1) are connected respectively to input terminals Di1, Ki1, Di2 and Ki2 of a first-stage basic cell 18-(0), which comprises a data comparator and data selectors. A pair C17(0) comprises relevant data D17(0) and key data K17(0), which are supplied to the external input terminals 17-(00) and 17-(01) respectively, whereas another pair C17(1) comprises relevant data D17(1) and key data K17(1), which are supplied to the external input terminals 17-(10) and 17-(11) respectively. The two pieces of key data K17(0) and K17(1) supplied to the external input terminals 17-(01) and 17-(11) respectively are used as pieces of base data to be compared in the first-stage basic cell 18-(0). As a result of the comparison, one of the pairs C17(0) and C17(1) is passed on to output terminals Do7 and Ko1 while the other pair is passed on to output terminals Do2 and Ko2.

The pair C17(0) is compound data comprising the relevant data D17(0) and the key data K17(0), which are supplied to the external input terminals 17-(00) and 17-(01) respectively. Likewise, the pair C17(1) is compound data comprising the relevant data D17(1) and the key data K17(1), which are supplied to the external input terminals 17-(10) and 17-(11) respectively.

The two pieces of key data K17(0) and K17(1) are compared in the first-stage basic cell 18-(0) in order to sort them. The basic cell 18-(0) always supplies the smaller key data to the output terminal Ko1 and the larger key data to the output terminal Ko2. If the two pieces of key data K17(0) and K17(1) are found equal to each other, the basic cell 18-(0) supplies the key data K17(0) to the output terminal Ko1 and the key data K17(1) to the output terminal Ko2. If the basic cell 18-(0) supplies the key data K17(0) to the output terminal Ko1 and the key data K17(1) to the output terminal Ko2, the relevant data D17(0) and the relevant data D17(1) are supplied to the output terminals Do1 and Do2 respectively. If the basic cell 18-(0) supplies the key data K17(0) to the output terminal Ko2 and the key data K17(1) to the output terminal Ko1, the relevant data D17(0) and the relevant data D17(1) are supplied to the output terminals Do2 and Do1 respectively By the same token, a compound-data pair C17(2) of relevant data D17(2) and key data K17(2) are supplied to respectively external input terminals 17-(20) and 17-(21) of a first-stage basic cell 18-(1), whereas another compound-data pair C17(3) of relevant data D17(3) and key data K17(3) are supplied to respectively external input terminals 17-(30) and 17-(31) of the first-stage basic cell 18-(1). In the same way, a compound-data pair C17(4) of relevant data D17(4) and key data K17(4) are supplied to respectively external input terminals 17-(40) and 17-(41) of a first-stage basic cell 18-(2), whereas another compound-data pair C17(5) of relevant data D17(5) and key data K17(5) are supplied to respectively external input terminals 17-(50) and 17-(51) of the first-stage basic cell 18-(2).

The two pieces of key data K17(2) and K17(3) are compared in the first-stage basic cell 18-(1) in order to sort them. By the same token, the two pieces of key data K17(4) and K17(5) are compared in the first-stage basic cell 18-(2) in order to sort them. In the same way, the two pieces of key data K17(6) and K17(7) are compared in the first-stage basic cell 18-(3) in order to sort them.

Generically speaking, two pieces of key data K17(2) and K17(3) are compared in the first-stage basic cell 18-(1) in order to sort them. The basic cell 18-(1) always supplies the smaller key data to the output terminal Ko1 and the larger key data to the output terminal Ko2. If the two pieces of key data K17(2) and K17(3) are found equal to each other, the basic cell 18-(1) supplies the key data K17(2) to the output terminal Ko1 and the key data K17(3) to the output terminal Ko2. If the basic cell 18-(2) supplies the key data K17(4) to the output terminal Ko1 and the key data K17(5) to the output terminal Ko2, the relevant data D17(4) and the relevant data D17(5) are supplied to the output terminals Do1 and Do2 respectively. If the basic cell 18-(3) supplies the key data K17(6) to the output terminal Ko2 and the key data K17 (7) to the output terminal Ko1, on the other hand, the relevant data D17(6) and the relevant data D17(7) are supplied to the output terminals Do2 and Do1 respectively.

Input terminals Di1 and Ki1 of a second-stage basic cell 18-(4) are connected to respectively the output terminals Do2 and Ko2 of the first-stage basic cell 18-(0). on the other hand, input terminals Di2 and Ki2 of the second-stage basic cell 18-(4) are connected to respectively the output terminals Do1 and Ko1 of the first-stage basic cell 18-(1).

In the same way, input terminals Di1 and Ki1 of a second-stage basic cell 18-(5) are connected to respectively the output terminals Do2 and Ko2 of the first-stage basic cell 18-(1). On the other hand, input terminals Di2 and Ki2 of the second-stage basic cell 18-(5) are connected to respectively the output terminals Do1 and Ko1 of the first-stage basic cell 18-(2).

By the same token, input terminals Di1 and Ki1 of a second-stage basic cell 18-(6) are connected to respectively the output terminals Do2 and Ko2 of the first-stage basic cell 18-(2). On the other hand, input terminals Di2 and Ki2 of the second-stage basic cell 18-(6) are connected to respectively the output terminals Do1 and Ko1 of the first-stage basic cell 18-(3).

The first-stage basic cells 18-(0) and 18-(1) are connected in series to the second-stage basic cell 18-(4) to form a pipeline configuration. By the same token, the first-stage basic cells 18-(1) and 18-(2) are connected in series to the second-stage basic cell 18-(5) to form a similar pipeline configuration. In the same way, the first-stage basic cells 18-(2) and 18-(3) are connected in series to the second-stage basic cell 18-(6) to form a similar pipeline configuration.

The second-stage basic cell 18-(4) compares sorted pieces of key data received from the first-stage basic cells 18-(0) and 18-(1), supplying the smaller and greater ones to respectively output terminals Ko1 and Ko2 of the second-stage basic cell 18-(4). On the other hand, the pieces of relevant data are supplied to respectively output terminals Do1 and Do2 of the second-stage basic cell 18-(4). Likewise, the second-stage basic cell 18-(5) compares pieces of data received from the first-stage basic cells 18-(1) and 18-(2), supplying the smaller and greater ones to respectively output terminals Ko1 and Ko2 of the second-stage basic cell 18-(5). On the other hand, the pieces of relevant data are supplied to respectively output terminals Do1 and Do2 of the second-stage basic cell 18-(5). By the same token, the second-stage basic cell 18-(6) compares pieces of data received from the first-stage basic cells 18-(2) and 18-(3), supplying the smaller and greater ones to respectively output terminals Ko1 and Ko2 of the second-stage basic cell 18-(6). On the other hand, the pieces of relevant data are supplied to respectively output terminals Do1 and Do2 of the second-stage basic cell 18-(6). Thus, pieces of key data output from the output terminal Ko1 of the first-stage basic cell 18-(0) and the output terminal Ko2 of the first-stage basic cell 18-(3) are not processed by the second-stage basic cells 18-(4) to 18-(6). Similarly, pieces of relevant data output from the output terminal Do1 of the first-stage basic cell 18-(0) and the output terminal Do2 of the first-stage basic cell 18-(3) are not supplied to the second-stage basic cells 18-(4) to 18-(6).

A basic block FB5 comprises seven basic cells, namely, the first-stage basic cells 18-(0) to 18-(3) and the second-stage basic cells 18-(4) to 18-(6) The basic block FB5 carries out the comparison and sorting processing two times on the pairs of compound data C17(0) to C17(7), outputting two inputs of processing results, namely, a pair of key data and relevant data from the output terminals Ko1 and Do1 of each of the second-stage basic cells 18-(4), 18-(5) and 18-(6), a pair of key data and relevant data from the output terminals Ko2 and Do2 of each of the second-stage basic cells 18-(4), 18-(5) and 18-(6), a pair of key data and relevant data from the output terminals Ko2 and Do2 of the first-stage basic cell 18-(0) and a pair of key data and relevant data from the output terminals Ko1 and Do1 of the first-stage basic cell 18-(3).

The eight pairs of compound data output by the basic block FB5 are supplied to third-stage basic cells 18-(7) to 18-(10) of a next basic block FB6, which also includes fourth-stage basic cells 18-(11) to 18-(13) in the same way as the pairs of compound data C17(0) to C17(7) are supplied to the first-stage basic cells 18-(0) to 18-(3) of the basic block FB1.

In the same way as the first-stage basic cells 18-(0) to 18-(3) are connected to the second-stage basic cells 18-(4) to (18)-(6) in the basic block FB5, the third-stage basic cells 18-(7) to 18-(10) are connected in series to the fourth-stage basic cells 18-(11) to 18-(13) to form a similar pipeline configuration in the basic block FB6. In the basic block FB6, pairs of compound data, which are sorted by the third-stage basic cells 18-(7) to 18-(10), are supplied to the three fourth-stage basic cells 18-(11) to 18-(13). As a result, the basic block FB6 outputs eight sorted pieces of data as pairs of compound data to a next basic block FB7 in the same way as the basic block FB5 outputs the eight sorted pieces of data as pairs of compound data to the basic block FB6.

The basic block FB7 also includes seven basic cells 10(14) to 18-(20). The fifth-stage basic cells 18-(14) to 18-(17) are used for receiving the eight sorted pieces of data from the basic block FB6 in the same way as the pairs of compound data C17(0) to D17(7) are received by the first-stage basic cells 18-(0) to 18-(3) of the basic block FB5.

In the same way as the first-stage basic cells 18-(0) to 18-(3) are connected to the second-stage basic cells 18-(4) to 18-(6) in the basic block FB5, the fifth-stage basic cells 18-(14) to 18-(17) are connected in series to the sixth-stage basic cells 18-(18) to 18-(20) to form a similar pipeline configuration in the basic block FB7. In the basic block FB7, pieces of data, which are sorted by the fifth-stage basic cells 18-(14) to 18-(17), are supplied to the three sixth-stage basic cells 18-(18) to 18-(20). As a result, the basic block FB7 outputs eight sorted pieces of data as pairs of compound data to a next basic block FB8 in the same way as the basic block FB5 outputs the eight sorted pieces of data as pairs of compound data to the basic block FBG.

The two inputs of compound data output by the basic block FB7 are supplied to seventh-stage basic cells 18-(21) to 18-(24) of a next basic block FB8, which also includes eighth-stage basic cells 18-(25) to 18-(27) in the same way as the pieces of compound data D9(0) to DO(7) are supplied to the first-stage basic cells 18-(0) to 18-(3) of the basic block FB5.

In the same way as the first-stage basic cells 18-(0) to 18-(3) are connected to the second-stage basic cells 18-(4) to 18-(6) in the basic block FB5, the seventh-stage basic cells 18-(21) to 18-(24) are connected in series to the eighth-stage basic cells 18-(25) to 18-(27) to form a similar pipeline configuration in the basic block FB8. In the basic block FB8, pieces of data, which are sorted by the seventh-stage basic cells 18-(21) to 18-(24), are supplied to the three eighth-stage basic cells 18-(25) to 18-(27). As a result, the basic block FB8 outputs eight sorted pieces of compound data as final pairs of output data to pairs of external output terminals 19-(00) and 19-(71) respectively in the same way as the basic block FB5 outputs the eight sorted pieces of data as pairs of compound data to the basic block FB6.

Pairs of output compound data, which are obtained as results of sort processing of the pairs of input compound data C17(0) to C17(7), appear at the pair of output terminals Do1 and Ko1 of the seventh-stage basic cell 18-(21), the pair of output terminals Do1 and Ko1 as well as the pair of output terminals Do2 and Ko2 of each of the eighth-stage basic cells 18-(25) to 18-(27) and the pair of output terminals Do2 and Ko2 of the seventh-stage basic cell 18-(24). Each pair of output compound data D19(0) to K19(7) is supplied as it is to the pair of external output terminals 19-(00) to 19-(71) respectively in an increasing-magnitude order of sorted pieces of key data K19(0) to K19(7), starting with the minimum K19(0) at the external output terminal 19-(01), and ending with the maximum at the external output terminal 19-(71). On the other hand, the pieces of relevant data D19(0)-D19(7) are supplied to the output terminals 19-(00)-19(70) respectively.

As described above, the four basic blocks FB5 to FB8 each comprising seven basic cells having uniform structures are connected to each other to form a pipeline configuration. The basic blocks FB5 to FB8 constitute a sort processing apparatus. The sort processing apparatus is thus a group of 28 basic cells. The 28 basic cells are each the aforementioned second basic cell provided by the present invention.

Since the number of pieces of input data supplied to the sort processing is 8 (N=8), the number of comparison carried out on the pieces of input data is 8×7/2=28 as is expressed by equation (1). This number is equal to the minimum number of theoretically required basic cells.

The sort processing apparatus implemented by the embodiment shown in FIG. 4 receives eight pieces of input data, which are an even number. It should be noted, however, that the number of pieces of input data can also be odd. In this case, an additional piece of input data is prepared as invalid input data, assume that the number of pieces of input data is 7. In this case, sort processing can be carried out by additionally preparing large data greater than the maximum among the seven pieces of theoretically valid input data or adding small data smaller than the minimum among the seven pieces of theoretically valid input data as the invalid input data.

Figure 5:
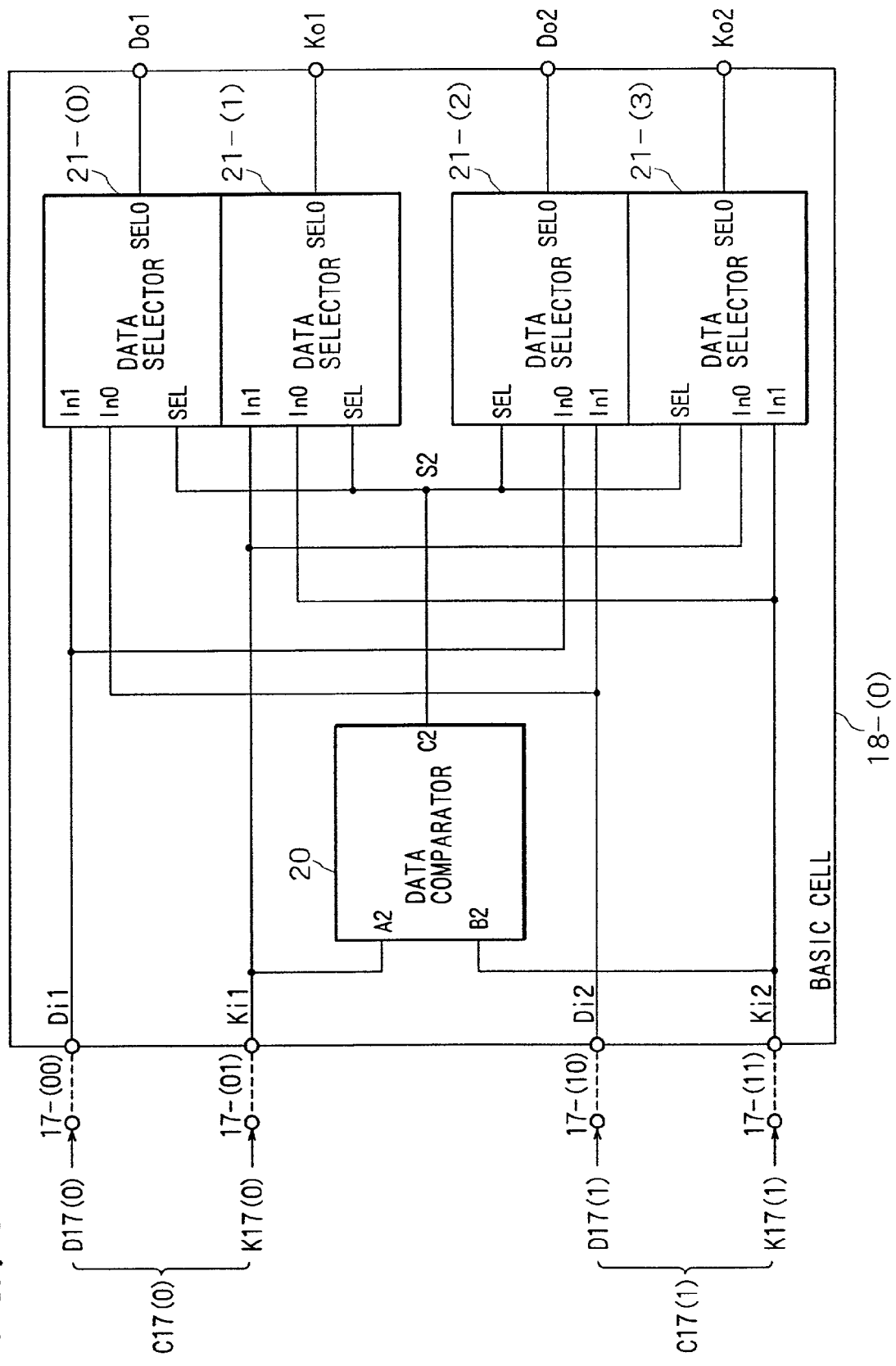
FIG. 5 is a block diagram showing the configuration of each of second basic cells each serving as a configuration element of the embodiment shown in FIG. 4.

Next, the internal structure of the second basic cell is explained by referring to FIG. 5. The basic cell 18-(0) shown in FIG. 4 is used as a representative first basic cell explained below. As shown in FIG. 5, the basic cell 18-(0) comprises a data comparator 20 serving as the aforementioned second data comparator provided by the present invention, and data selectors 21-(0) and 21-(3) each serving as the aforementioned second data selector provided by the present invention.

The input terminals Di1, Ki1, Di2 and Ki2 of the basic cell 18-(0) are connected to the external input terminals 17-(00), 17-(01), 17-(10) and 17-(11) respectively. The external input terminals 17-(00), 17-(01) 17-(01) and 17-(11) receive the relevant data D17(0), the key data K17(0), the relevant data D17(1) and the key data K17(1) respectively. The relevant data D17(0) and the key data K17(0) form the compound data C17(0) whereas the relevant data D17(1) and the key data K17(1) form the compound data C17(1) as shown in FIG. 4.

The input terminals Ki1 and Ki2 of the basic cell 18-(0) are also connected respectively to input terminals A2 and B2 of the data comparator 20, which compares the key data K17(01) with the key data K17(11), generating a select signal S2 at an output terminal C2 of the data comparator 20 as a result of comparison. The select signal S2 functions as the aforementioned second select signal provided by the present invention.

In addition, the input terminal Ki1 of the basic cell 18-(0) is also connected to an input terminal In1 of the data selector 21-(1) and an input terminal In0 of the data selector 21-(3). On the other hand, the input terminal Ki2 of the basic cell 18-(0) is also connected to an input terminal In0 of the data selector 21-(1) and an input terminal In1 of the data selector 21-(3).

Furthermore, the input terminal Di1 of the basic cell 18-(0) is also connected to an input terminal In1 of the data selector 21-(0) and an input terminal In0 of the data selector 21-(2). On the other hand, the input terminal Di2 of the basic cell 18-(0) is also connected to an input terminal 10 of the data selector 21-(0) and an input terminal In1 of the data selector 21-((2).

The select signal S2 is supplied to a control terminal SEL of the data selector 21-(0), a control terminal SEL of the data selector 21-(1), a control terminal SEL of the data selector 21-(2) and a control terminal SEL of the data selector 21-(3). An output terminal SEL0 of the data selector 21-(0), an output terminal SEL0 of the data selector 21-(1), an output terminal SEL0 of the data selector 21-(2) and an output terminal SEL0 of the data selector 21-(3) are connected to respectively the output terminals Do1, Ko1, Do2 and Ko2 of the basic cell 18-(0).

The following description explains the operation of the basic cell 18-(0) with the configuration described above. As described above, the data comparator 20 compares the key data K17(0) with the key data K17(1). If the key data K17(1) is found greater than the key data K17(0), the select signal S2 is set at a logic value of "1". If the key data K17(1) is found equal to or smaller than the key data K17(0), on the other hand, the select signal S2 is set at a logic value of "0".

If the select signal S2 is set at a logic value of "1" to indicate that K17(1)>K17(0), the data selector 21-(1) passes on the key data K17(0) received at the input terminal In1 thereof to the output terminal Ko1 by way of the output terminal SEL0, and the data selector 21-(3) passes on the key data K17(1) received at the input terminal In1 thereof to the output terminal Ko2 by way of the output terminal SEL0.

At the same time, the data selector 21-(0) passes on the relevant data D17(0) received at the input terminal In1 thereof to the output terminal Do1 by way of the output terminal SEL0, and the data selector 21-(2) passes on the key data D17(1) received at the input terminal In1 thereof to the output terminal Do2 by way of the output terminal SEL0.

That is to say, for K17(1)>K17(0), K17(0) and K17(1) are sorted so that the smaller key data K17(0) is supplied to the output terminal Ko1 and the larger key data K17(1) is supplied to the output terminal Ko2. At the same time, the data selector 21-(0) passes on the relevant data D17(0) related to the key data K17(0) to the output terminal Do1 forming a pair with the output terminal Ko1, and the data selector 21-(2) passes on the key data D17(1) related to the key data K17(1) to the output terminal Do2 forming a pair with the output terminal Ko2.

If the select signal S2 is set at a logic value of "0" to indicate that K17(1)≦K17(0), on the other hand, the data selector 21-(1) passes on the key data K17(1) received at the input terminal In0 thereof to the output terminal Ko1 by way of the output terminal SEL0, and the data selector 21-(3) passes on the key data K17(0) received at the input terminal In0 thereof to the output terminal Ko2 by way of the output terminal SEL0.

At the same time, the data selector 21-(2) passes on the relevant data D17(0) received at the input terminal In0 thereof to the output terminal Do2 by way of the output terminal SEL0, and the data selector 21-(0) passes on the key data D17(1) received at the input terminal In0 thereof to the output terminal Do1 by way of the output terminal SEL0.

That is to say, for K17(1)≦K17(0), K17(0) and K17(1) are sorted so that the smaller key data K17(1) is supplied to the output terminal Ko1 and the larger key data K17(0) is supplied to the output terminal Ko2. For K17(1)=K17(0), the key data K17(1) is supplied to the output terminal Ko1 and the key data K17(0) is supplied to the output terminal Ko2. In either case, at the same time, the data selector 21-(2) passes on the relevant data D17(0) related to the key data K17(0) to the output terminal Do2 forming a pair with the output terminal Ko2, and the data selector 21-(0) passes on the key data D17(1) related to the key data K17(1) to the output terminal Do1 forming a pair with the output terminal Ko1.

To summarize what has been described above, in the basic cell 18-(0), the data comparator 20 and the data selectors 21-(0), 21(1), 21(2) and the 21-(3) operate to compare the key data K17(0) supplied to the input terminal Ki1 with the key data K17(1) supplied to the input terminal Ki2 and, if the key data K17(1) supplied to the input terminal Ki2 is found greater than the key data K17(1) supplied to the input terminal Ki1, the key data K17(0) supplied to the input terminal Ki1 is passed on to the output terminal Ko1 while the input data K17(1) supplied to the input terminal Ki2 is passed on to the output terminal Ko2

If the basic cell 18-(0) finds that the key data K17(1) supplied to the input terminal Ki2 is equal to or smaller than the key data K17(0) supplied to the input terminal Ki1, the key data K17(0) supplied to the input terminal Ki1 is passed on to the output terminal Ko2 while the key data K17(1) supplied to the input terminal Ki2 is passed on to the output terminal Ko1.

As described above, pieces of compound data comprising key data and relevant data related to the key data are rearranged so that key data passed on to the output terminal Ko1 is always equal to or smaller than key data passed on to the output terminal Ko2 without regard to the random magnitude order in which the pieces of key data are supplied to the input terminals Ko1 and Ko2. At the same time, relevant data related to the key data passed on to the output terminal Ko1 is always supplied to the output terminal Do1 while relevant data related to the key data passed on to the output terminal Ko2 is always supplied to the output terminal Do2. Thus, the basic cell 18-(0) functions as a sort processing unit for sorting two pieces of compound data comprising key data and relevant data by comparing two pieces of key data, which are associated with the two pieces of relevant data respectively.

In addition, the comparison condition of the data comparator 20 can also be set as follows. That is to say, if the key data K17(1) is found smaller than the key data K17(0), the select signal S2 is set at a logic value of "1" and, if the key data K17(1) is found equal to or greater than the key data K17(0), on the other hand, the select signal S2 is set at a logic value of "0". In this case, the basic cell 18-(0) functions as a sort processing unit comprising the data comparator 20 and the data selectors 21-(0) to 21-(3) that sort pairs of compound data into the reversed order.

Figure 6:
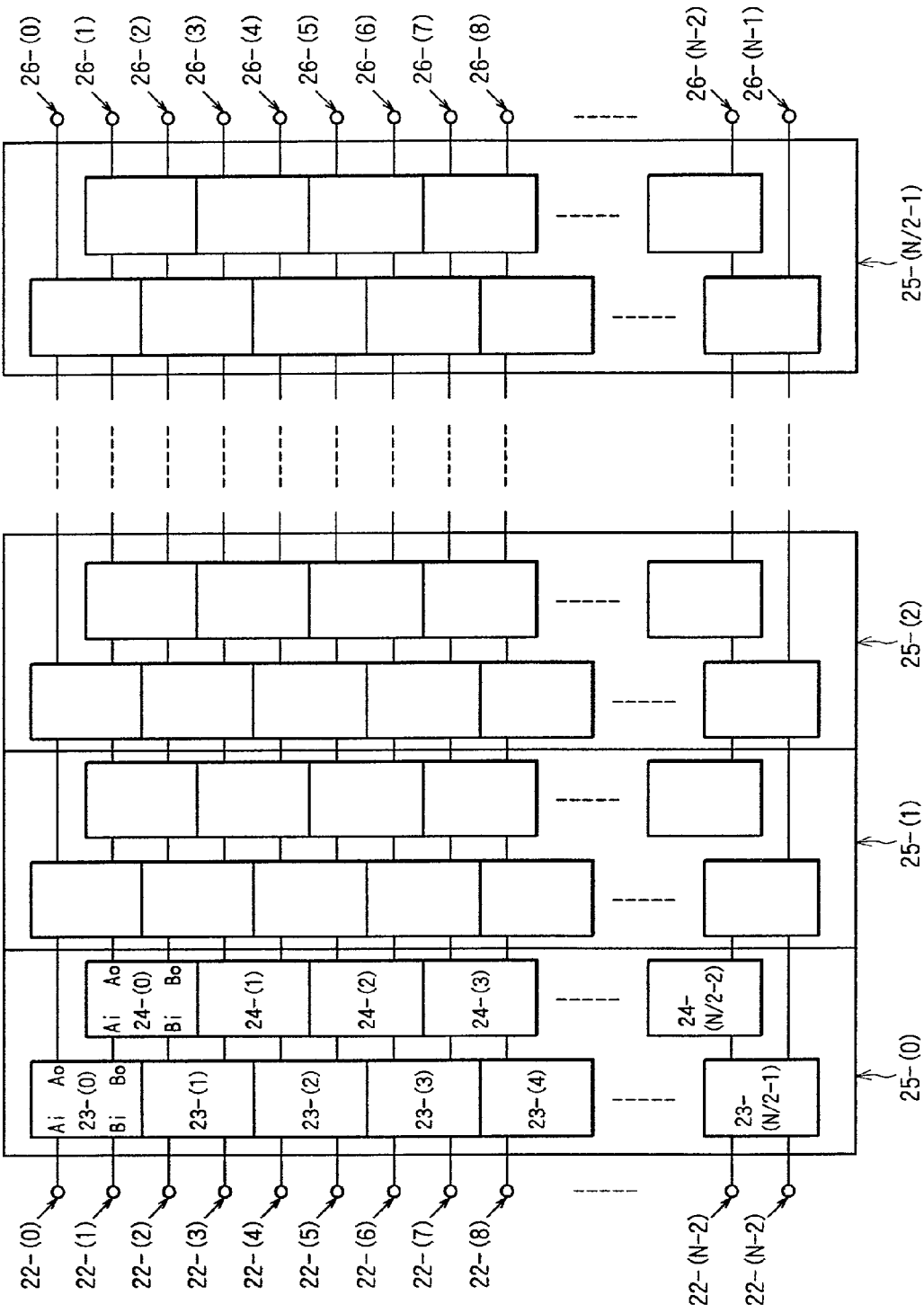
FIG. 6 is a block diagram showing the configuration of the first embodiment of the present invention with more pieces of input data.

FIG. 6 is a diagram showing the configuration of another sort processing apparatus similar to that shown in FIG. 1 except that the number of pieces of input data is increased. To be more specific, the sort processing apparatus has basic cells 23-(0) to 23-(N/2−1), which are each identical with the basic cell 10-(0) shown in FIG. 1, where N is an even number greater than eight. To put it in detail, first of all, at the first stage, the number of basic cells arranged in the vertical direction is increased to N/2. The pair of input terminals Ai and Bi of the basic cell 23-(0) to 23-(N/2−1) are connected to external input terminals 22-(0) and 22-(N−2) respectively.

Then, much like the second stage shown in FIG. 1, a second stage for the sort processing apparatus shown in FIG. 6 is sandwiched by a line connected to an output terminal Ao of the basic cell 23-(0) and a line connected to an output terminal Bo of the basic cell 23-(N/2−1). This second stage comprises (N/2−1) basic cells 24-(0) to 24(N/2−2). Input terminals Ai and Bi of the second-stage basic cell 24-(1) to 24-(N/2−2) are connected to respectively an output terminal Bo of the first-stage basic cell 23-(0) to 23-(N/2−1) and an input terminal Ao of the first-stage basic cell 23-(0) to 23-(N/2−1). The N/2 first-stage input basic cells 23-(0) to 23-(N/2−1) and the second-stage basic cells 24-(0) to 24-(N/2−2) form a first basic block 25-(0).

This extended sort processing apparatus comprises N/2 basic blocks 25-(0) to 25-(N/2−1), which are arranged in the horizontal direction. The last basic block 25-(N/2−1) has external output terminals 26-(0) to 26-(N/2−1).o By adopting the extension technique described above, an increased number of pieces of input data can be handled by an increased number of basic cells, which can be arranged in a square area so as to provide a dense sort processing apparatus including no gaps between the basic cells. In the case of a sort processing apparatus implemented as a semiconductor device such as an LSI, the basic cells can be arranged regularly, allowing the semiconductor integration to be carried out with ease.

In this case, the number of basic cells is expressed as follows:

$$\text{Number of basic cells} = (N/2 + N/2 - 1) \times (N/2) = N \times (N-1)/2 \quad (3)$$

The number of basic cells given above is equal to the theoretical minimum number of basic cells or the number of possible two input combinations extracted from N inputs.

Figure 7:
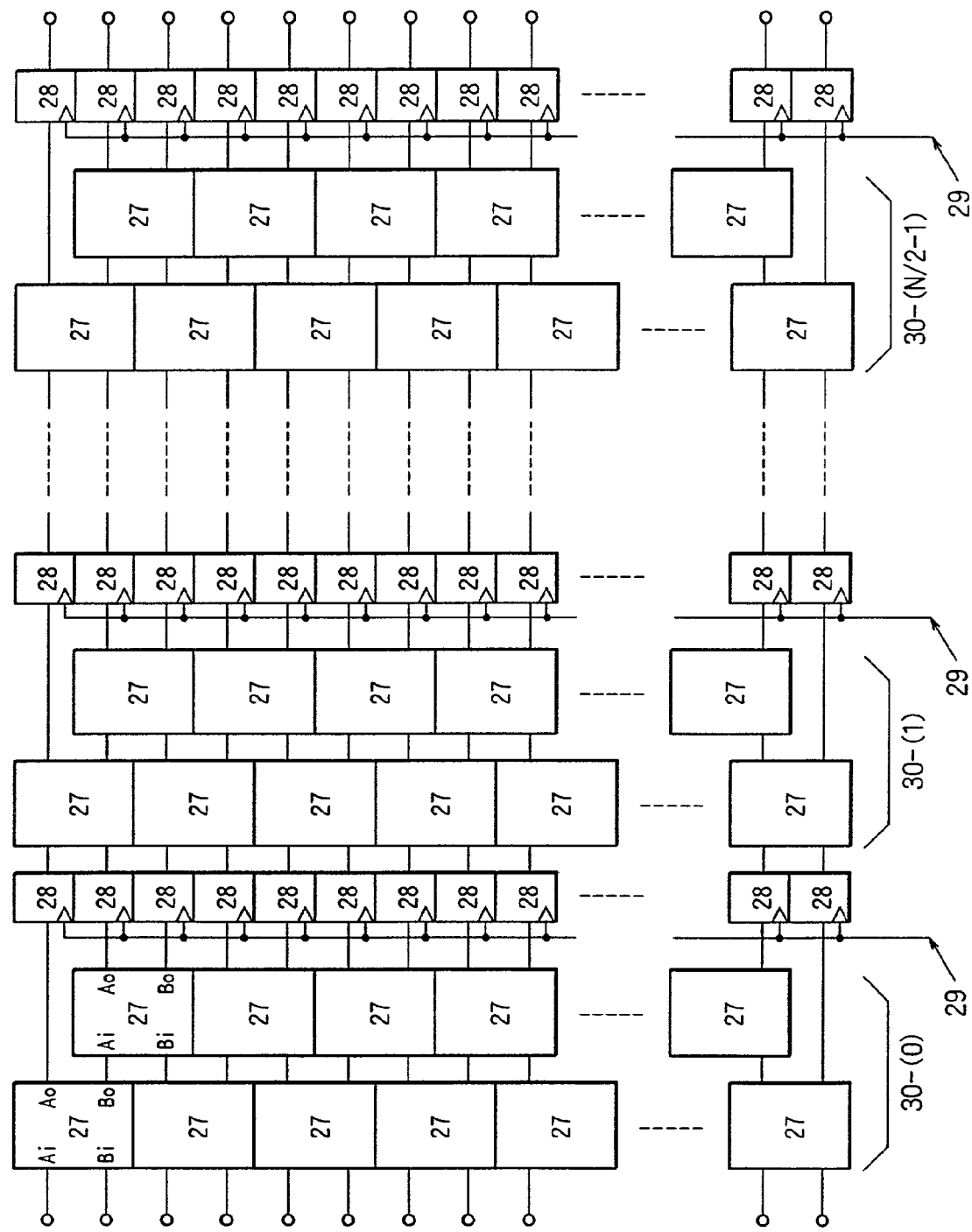
FIG. 7 is a block diagram showing the configuration of another embodiment of the present invention including means for preventing an operation speed of the sort processing from decreasing.
Figure 8:
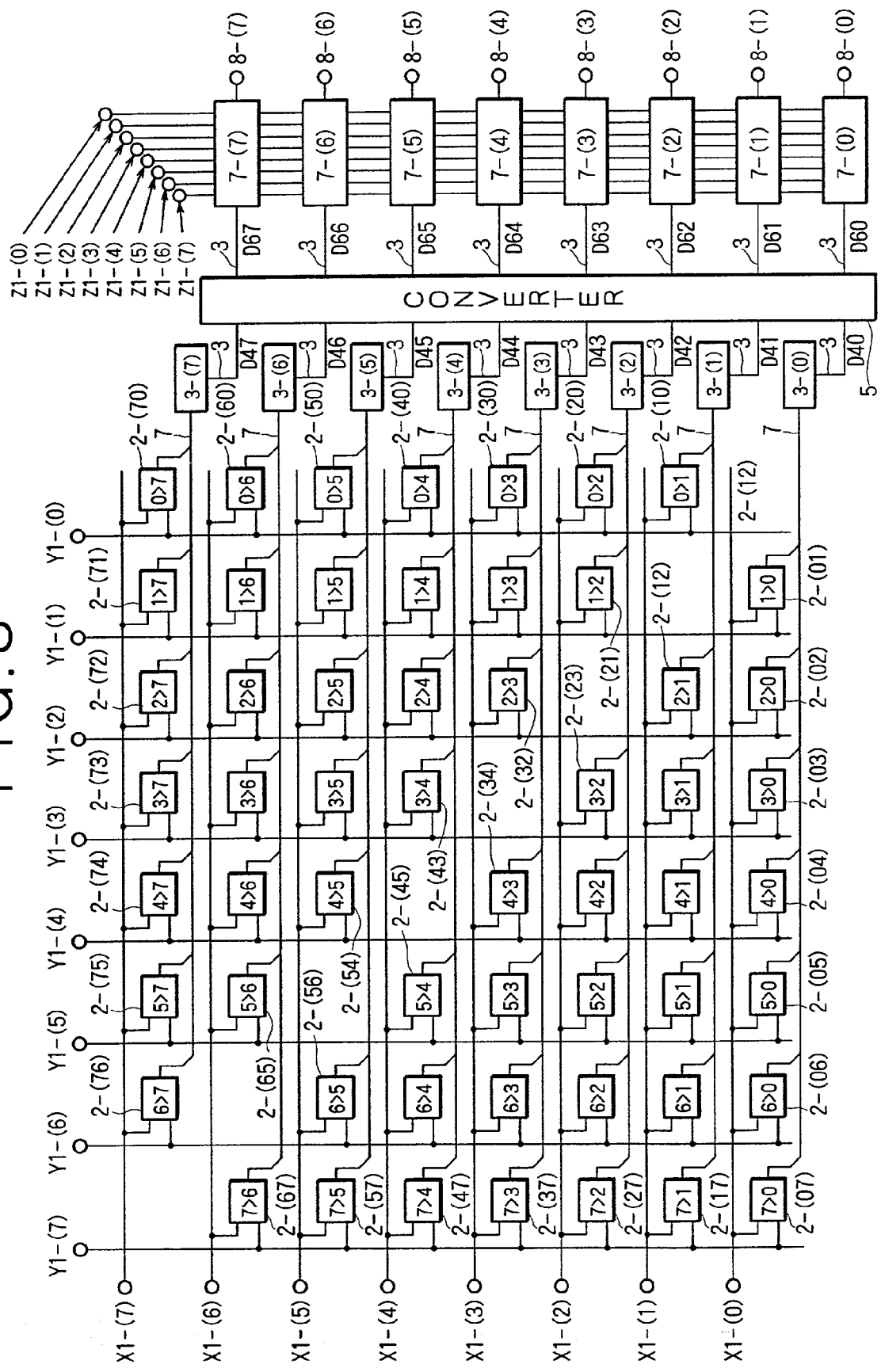
FIG. 8 is a block diagram showing the configuration of the conventional sort processing apparatus.

FIG. 7 is a diagram showing the configuration of a further sort processing apparatus with hardware similar to that shown in FIG. 1. Reference numeral 27 denotes a basic cell identical with the basic cell 10-(0) shown in FIG. 1. As shown in FIG. 7, this sort processing apparatus comprises basic blocks 30-(0) to 30-(N/2−1). For a large number of inputs, the propagation time of a signal passing through a basic cell 27 may greatly vary. It is thus quite within the bounds of possibility that the overall operation speed decreases.

In order to solve this problem, as shown in FIG. 7, data latches 28 each serving as a storage means are provided at points of connection between the basic blocks 30-(0) and 30-(N/2−1) so that the sort processing can be carried out in a pipeline manner.

The time to complete the sort processing is increased by the existence of stages of the data latches 28. Since the data latches 28 at each of the stages between the basic blocks 30-(0) and 30-(N/2−1) are controlled by a clock signal 29, the clock signal 29 allow pieces of data completing sort processing at any of the stages to be output to the next stage at the same time.

The means for solving the deterioration of the operation speed as described above can be applied not only the sort processing apparatus of FIG. 1 for pieces of single input data as shown in FIG. 7, but also the sort processing apparatus for pairs of compound data as shown in FIG. 4.

As described above, in accordance with the sort processing method provided by the present invention, simple basic processing is carried out repeatedly in a pipelining manner a minimum number of times theoretically required for processing a given number of pieces of input data. Thus, in comparison with the conventional sort processing method, the sort processing method provided by the present invention can be implemented by using more compact hardware and executed in a shorter processing time. In addition, since an increased number of pieces of input data can be processed by merely adding the number of times the basic processing is carried out, the size of the hardware can be increased with ease.

Furthermore, in the first sort processing apparatus provided by the present invention, basic processing is carried out repeatedly in a pipeline manner and a simple way a minimum number of times theoretically required for processing a given number of pieces of input data by using a group of first basic cells in order to carry out sort processing. By the same token, in the second sort processing apparatus provided by the present invention, basic processing is carried out repeatedly in a pipeline manner and a simple way a minimum number of times theoretically required for processing a given number of pieces of compound data by using a group-of second basic cells in order to carry out sort processing. It is thus possible to eliminate adders and a converter, which are employed in the conventional sort processing apparatus. As a result, the first and second sort processing apparatus can be implemented by more compact hardware capable of carrying out the sort processing in a shorter period of time.

Moreover, the first and second sort processing apparatus are capable of handing additional pieces of input data by merely provided additional first and second basic cells respectively in a simple manner. As a result, from the hardware point of view, the sort processing apparatus can be extended with ease.

In addition, besides the effects described above, the second sort processing apparatus provided by the present invention offers a merit that each input data may comprise a plurality of pieces of data related to each other. In this case, one of the pieces of data is used as key data. Then, while pieces of key data are being sorted into a magnitude order, pieces of relevant data, which are related to the pieces of key data, are arranged by associating the pieces of relevant data with the pieces of key data.

While the preferred embodiments of the present invention have been described using the specific terms, such description is for illustrative purposes only, and it is to be understood that changes and variations may be made without departing from the spirit or scope of the following claims.

What is claimed is:

1. A sort processing apparatus for comparing magnitudes of pieces of input data with each other, rearranging said pieces of input data in accordance with results of said comparison, and outputting the compared and selected pieces of data in a data processing system, said apparatus comprising:
   a data magnitude comparing system for comparing magnitudes of pieces of input data with each other and for outputting a select signal, comprising basic blocks which comprise two-stage parallel basic cells, each of which comprises a data comparator, wherein the two-stages include a first stage and a second stage, and means for rearranging said compared pieces of input data in a magnitude order on the basis of said select signal, comprising a data selector;
   wherein the number of said parallel basic cells in said first stage of said basic block is larger by one than the number of said parallel basic cells in said second stage of said basic block, and the total number of said basic cells is equal to the number of combinations of pieces of input data to be compared.

2. An apparatus according to claim 1 wherein said data selector is provided with a pair of data selectors used for receiving a pair of pieces of input data; and
   said data selector is controlled on the basis of said select signal so as to allow output terminals of said data selectors to output said pair of pieces of input data in a predetermined magnitude order.

3. An apparatus according to claim 1 wherein the size of sort processing is increased by raising the number of basic cells to keep up with an increase in the number of pieces of input data.

4. An apparatus according to claim 1 wherein latches are used between said basic cells in order to synchronize said pieces of input data which have been sorted.

5. An apparatus according to claim 1 wherein each of said basic cells sorts particular ones of said pieces of input data by controlling said first data selector thereof for said particular pieces of input data by using said select signal.

6. An apparatus according to claim 1 wherein, if the number of said pieces of input data is odd, an invalid piece of input data is added to said valid pieces of input data to make the total number of said pieces of input data even, and said invalid piece of input data is set at a value greater than a maximum among said valid pieces of input data or a value smaller than a minimum among said valid pieces of input data.

7. An apparatus according to claim 1 wherein said basic cells are laid out over a rectangular area.

8. An apparatus according to claim 1, wherein said basic cells comprise first basic cells, said data comparator comprises a first data comparator, said data selection comprises a first data selector, said apparatus is further able to compare magnitudes of pieces of compound data including key data and relevant data related to said key data with each other and to rearrange said pieces of compound data in accordance with results of said comparison, in a data processing system, and said apparatus further comprises second basic cells, each of which includes a second data comparator for comparing magnitudes of pieces of key data with each other and for outputting a second select signal, and a second data selector for rearranging said relevant data of said compound data in a magnitude order of said key data on the basis of said second select signal, wherein the total number of said second basic cells is equal to the number of combinations of pieces of compound data to be compared.

9. An apparatus for comparing magnitudes of pieces of compound data including key data and relevant data related to said key data with each other, rearranging said pieces of compound data in accordance with results of comparison, and outputting the compared and selected pieces of data in a data processing system, said apparatus comprising:
   basic blocks which consist of two-stage parallel basic cells, each of which includes a data comparator for comparing magnitudes of pieces of key data with each other and for outputting a select signal, and a data selector for rearranging said relevant data of said compound data in a magnitude order of said key data on the basis of said select signal;
   wherein the number of said parallel basic cells in said first stage of said basic block is larger by one than the number of said parallel basic cells in said second stage of said basic block, and the total number of said basic cells is equal to the number of combinations of pieces of compound data to be compared.

10. An apparatus according to claim 9 wherein said data selector is provided with two pairs of data selectors for receiving a pair of pieces of said key data so as to perform selection of said key data and for receiving a pair of said relevant data so as to perform selection of said relevant data; and
   each of said selectors is controlled on the basis of said selection signal.

11. An apparatus according to claim 9 wherein the size of sort processing is increased by raising the number of basic cells to keep up with an increase in the number of pieces of compound data.

12. An apparatus according to claim 9 wherein latches are used between said basic cells in order to synchronize said pieces of compound data which have been sorted.

13. An apparatus according to claim 9 wherein each of said basic cells sorts particular ones of said pieces of compound data by controlling said data selector thereof for said particular pieces of compound data by using said select signal.

14. An apparatus according to claim 9 wherein, if the number of said pieces of compound data is odd, an invalid piece of compound data is added to said valid pieces of compound data to make the total number of said pieces of compound data even, and said invalid piece of compound data is set at a value greater than a maximum among said valid pieces of compound data or a value smaller than a minimum among said valid pieces of compound data.

15. An apparatus according to claim 9 wherein said basic cells are laid out over a rectangular area.

* * * * *